United States Patent [19]

Bilkadi

[11] Patent Number: 5,914,162
[45] Date of Patent: Jun. 22, 1999

[54] COATING FOR METAL SURFACES OF UNSATURATED POLYMER AND COLLOIDAL INORGANIC PARTICLES

[75] Inventor: Zayn Bilkadi, Mahtomedi, Minn.

[73] Assignee: Minnesota Mining and Manufacturing Company, St. Paul, Minn.

[21] Appl. No.: 07/857,701

[22] Filed: Mar. 25, 1992

Related U.S. Application Data

[63] Continuation of application No. 07/401,832, Sep. 1, 1989, abandoned, which is a continuation-in-part of application No. 07/180,057, Apr. 11, 1988, abandoned.

[51] Int. Cl.⁶ .............................. B32B 1/08; B32B 15/02; B32B 15/08; C08K 3/36
[52] U.S. Cl. ................... 428/35.8; 428/35.9; 428/331; 428/354; 428/412; 428/425.8; 428/458; 428/461; 428/462; 524/413; 524/437; 524/492; 524/555; 524/559
[58] Field of Search ................... 428/331, 451, 428/35.8, 35.9, 354, 412, 425.8, 458, 461, 462; 524/413, 437, 492, 555, 559

[56] References Cited

U.S. PATENT DOCUMENTS

| | | | |
|---|---|---|---|
| 3,013,897 | 12/1961 | Cupery et al. | 117/46 |
| 3,069,375 | 12/1962 | Bullitt et al. | 260/29.3 |
| 3,753,769 | 8/1973 | Steiner | 117/122 |
| 3,968,305 | 7/1976 | Oshima et al. | 428/412 |
| 4,085,245 | 4/1978 | DeVito et al. | 428/215 |
| 4,210,712 | 7/1980 | Munger et al. | 430/275 |
| 4,221,697 | 9/1980 | Osborn et al. | 260/42.53 |
| 4,243,722 | 1/1981 | Haluska | 428/450 |
| 4,249,011 | 2/1981 | Wendling | 548/312 |
| 4,262,072 | 4/1981 | Wendling et al. | 430/14 |
| 4,310,600 | 1/1982 | Cross | 428/447 |
| 4,311,783 | 1/1982 | Dessauer | 430/905 |
| 4,323,591 | 4/1982 | Wendling et al. | 427/53.1 |
| 4,348,462 | 9/1982 | Chung | 428/412 |
| 4,384,011 | 5/1983 | Aoyama et al. | 522/136 |
| 4,390,401 | 6/1983 | Costanza | 522/181 |
| 4,427,823 | 1/1984 | Inagaki et al. | 524/833 |
| 4,499,217 | 2/1985 | Yoshimura et al. | 523/456 |
| 4,526,910 | 7/1985 | Das et al. | 524/502 |
| 4,542,088 | 9/1985 | Kojima et al. | 430/905 |
| 4,563,413 | 1/1986 | Messer | 430/915 |
| 4,576,975 | 3/1986 | Reilly, Jr. | 430/919 |
| 4,656,094 | 4/1987 | Kojima et al. | 428/331 |
| 4,742,111 | 5/1988 | Chi | 524/841 |
| 4,755,425 | 7/1988 | Huang | 524/493 |
| 4,772,660 | 9/1988 | Kitamura et al. | 524/786 |
| 4,830,909 | 5/1989 | Cohen et al. | 428/331 |
| 4,885,332 | 12/1989 | Bilkadi | 524/722 |
| 5,180,757 | 1/1993 | Lucey | 522/83 |

FOREIGN PATENT DOCUMENTS 0 050 996  5/1982  European Pat. Off. .

OTHER PUBLICATIONS

U.S. Patent Application Serial No. 180,057 (Bilkadi) filed Apr. 11, 1988.
"Websters 9th Collegiate Dictionary", New York, 1990, Webster New World, pp. 934.
Chem Abstracts, vol. 106, No. 20, abstract No. 158053m.

*Primary Examiner*—Robert E. Sellers
*Attorney, Agent, or Firm*—Paul W. Busse

[57] ABSTRACT

Strippable, primerless, radiation curable protective coatings for silver, nickel, brass and aluminum surfaces comprising (a) colloidal inorganic oxide particles of diameter less than 50 nanometers;

(b) non-silyl polyethylenically unsaturated monomers and oligomers; and (c) catalytic amounts of suitable photo-initiators.

The cured protective coatings are useful for shaped metal objects and for metal coated thermoplastic substrates.

11 Claims, No Drawings

COATING FOR METAL SURFACES OF UNSATURATED POLYMER AND COLLOIDAL INORGANIC PARTICLES

This is a continuation of application Ser. No. 07/401,832 filed Sep. 1, 1989, which is a continuation-in-part of U.S. Ser. No. 07/180,057 filed on Apr. 11, 1988, both now abandoned.

BACKGROUND OF THE INVENTION

1. Field of the Invention

This invention relates to UV and e-beam curable, transparent and abrasion resistant coatings which adhere tenaciously to metals, especially aluminum, brass, silver and nickel surfaces and which protect said surfaces from discoloration by corrosion and/or by exposure to boiling water. Yet these coatings can easily be stripped from said metal surfaces by exposure to 15% ammonium hydroxide solutions.

2. Background of the Art

One of the most common reasons for discoloration of metals is their tendency to corrode under the influence of the environment. A very common example of corrosion is the rusting of iron in any humid atmosphere and the subsequent destruction of its surface. Ordinarily, most common metals such as iron, steel, aluminum and their various alloys have been protected from corrosion by coating those substrates with paints, lacquers and varnishes, or in other cases by anodizing their surfaces or electroplating and deposition of protective metallic coatings. Metal alloys are also used which are more resistant to corrosion than the metals themselves (e.g., stainless steel), but the improvement in corrosion resistance is often at the sacrifice of other properties.

Although other metals such as copper, silver, nickel and their alloys are much more resistant to corrosion than iron, it is well known that these metals too are subject to some corrosion and subsequent tarnishing, especially at relatively high temperatures. For example copper and its alloy, brass, are capable of resisting attack by pure steam, but if much carbon dioxide, oxygen, or ammonia is present, the aqueous condensate becomes corrosive. Condensates containing 5 ppm of oxygen and 15 ppm of carbon dioxide have been shown to have a corrosion rate of 0.18–0.35 mm/year in contact with copper alloys. Another environment which causes brass and copper to corrode and discolor is saltwater. For example, in quiet seawater, copper and brass corrode at a rate nearing 50 micrometer/year. In the case of silver, copper, and brass, one of the most common causes of discoloration is the reaction of the surface with sulfur-containing chemicals, especially $SO_2$ and $H_2S$. In the case of silver, hydrogen sulfide in the atmosphere, which is one by-product of the burning of sulfur-containing fossil fuels, causes most of the tarnish. In the case of brass and copper, moisture is needed in combination with $H_2S$ and $SO_2$ for corrosion to take place.

In many industrial, household, and decorative products where brass, silver, aluminum and nickel metals are used, the need is for a protective coating which not only protects the surface from discoloration, but which in certain cases, such as bathroom or kitchen fixtures, resists extended exposure to hot water and household chemicals while retaining its aesthetic appearance, abrasion resistance, transparency, lubricity and the like. Clear lacquers are sometimes used, as are silicone coatings, epoxy coatings, or various combinations of multilayers thereof. For example Incralac®, a clear lacquer for brass developed by the International Copper Research Institute preserves the bright copper or brass color for decorative reasons. However, inherent in these organic coatings are several properties that remain in need of improvement, including low abrasion resistance and poor adhesion to the metal, especially after exposure to a moist environment. For example, no lacquer based coating on the market today can withstand abrasion by a fine steel wool pad, such as Steel Wool #0000, without visible surface damage.

The problem of poor adhesion of protective coatings to metals in general has been addressed in many ways. For example, primers which couple top coats to the substrates are known. Patent publications abound with primer technology, however, primers are not universal and must be matched according to both the nature of the coating and the nature of the substrate.

Adhesion additives, such as silane and titanate coupling agents, have also been used extensively. These additives function by co-reacting in situ with the coating and then reacting with the substrate when the coating is laid on the substrate to give the bonding effect (e.g., U.S. Pat. No. 4,396,650).

Surface roughening or texturing followed by coating with various polymers and the subsequent surmounting of such polymers by the protective overcoat is another known method for promoting adhesion to metal substrates.

Still, in the case of such metals as brass, nickel, and silver the above priming methods have proved inadequate or insufficient to overcome the problem of their poor adhesion to protective organic coatings.

Abrasion resistant coating with good adhesion to metals were described in U.S. Pat. No. 4,243,722 (Haluska) and U.S. Pat. No. 4,742,111 (Chi). These compositions are aqueous dispersions of colloidal silica in lower aliphatic alcohol-water solution of a partial condensate of a mixture of silanols of the formula $RSi(OH)_3$ wherein R is an alkyl radical or a substituted alkyl radical containing, among other groups, mercaptyl groups acting both as anti-tarnishing agents and as adhesion promoters. A phenolic resin was added in the compositions disclosed by Chi. The compositions described in the Haluska patent and Chi patent are very similar to abrasion resistant compositions described for example in U.S. Pat. Nos. 3,976,497; 3,986,997; 3,708,285; 4,368,236; and 4,680,232.

Although the coatings disclosed by Haluska and Chi provide adequate adhesion to gold and silver when hydrolyzed mercaptosilanes are included, they suffer from several major drawbacks which render them impractical or unsuitable for certain industrial applications. These drawbacks are inherent in all compositions which rely on hydrolyzed silanes or functionalized silanes in the formulation of protective coatings. One drawback is that the shelf-life of the partially hydrolyzed silanes or functionalized silanes is often limited due to the progressive gelling of the condensation polymer, as is documented in U.S. Pat. No. 3,986,997 for example. Normally this progressive gelling may be slowed down somewhat, but not eliminated, when the solution is stored at or below 4° C. as is usually recommended by the manufacturer. A second drawback of these materials is that they are relatively slow in curing, requiring normally one hour of precure at room temperature, followed by from two to fifteen hours of bake time. A third drawback is that the cure temperatures required are relatively high. For example, in example 2 of the Haluska patent the bake temperatures varied from 80° C. to 125° C., and the bake times were 15 hours. Last, but not least, is that abrasion resistant coatings derived from aqueous dispersions of colloidal silica in partially hydrolyzed silanes are incapable of withstanding immersion in boiling water or extended exposure to steam without shrinkage, cracking and delamination, probably due to additional crosslinking reaction due to hydrolysis of unreacted alkoxy groups in the silane molecules.

In many decorative and reflective products (including plumbing fixtures) which involve vapor coated or sputter coated metals on synthetic thermoplastic films, the materials disclosed by Haluska are entirely impractical for protecting the metal films because of the high bake temperatures and the long bake times required. What is desired for these decorative products are primerless, well adhering protective films that cure at high speeds and at temperatures much below the thermal distortion temperatures of the thermoplastic substrate. Ideally, radiation curable compositions whereby UV or e-beam irradiation is used to harden the protective coating are desired. Additionally, these products would use important advantage of radiation curable protective coatings, their relative insensitivity to moisture at high temperature resulting from their cure mechanism being through free radical induced polymerization.

In U.S. Pat. No. 4,348,462 (Chung) photocurable compositions based on mixtures of (a) glycidoxy and acryloxy functional silanes, (b) non-silyl acrylates and (c) colloidal silica, have been disclosed. Although it has been stated in the Chung patent that these compositions provide abrasion resistant coatings for metals, without specifying which ones, it has been our experience that these compositions do not adhere to silver and brass without a suitable primer layer and in particular, as stated in U.S. Pat. No. 4,243,722 (Haluska), a mercapto-functional silane is needed for adhesion to silver (and gold). Additionally, it has been our experience that compositions containing photocurable (i.e. acryloxy and glycidoxy functionalized) silanes are not resistant to steam and extended exposure to moisture (for example immersion in boiling water for more than ten minutes), in part because of additional hydrolysis and subsequent condensation of unreacted alkoxy groups.

Non-silyl photocurable compositions based on multifunctional acrylate or methacrylate monomers such as the ones described in U.S. Pat. Nos. 3,968,305 or 4,262,072, are widely accepted alternatives to silane-based hardcoats for protecting thermoplastic substrates. Despite their desirable properties in so far as ease of crosslinking, transparency, chemical inertness and abrasion resistance, the adhesion of top coats derived from polyfunctional acrylates or methacrylates to the metals silver, brass, nickel and aluminum is very poor. No radiation curable hardcoat is known to have been shown so far to exhibit long-term adhesion to silver, brass, or nickel under the corrosive environments discussed above. One reason for the lack of adhesion of radiation curable monomers, such as polyfunctional acrylates, to unprimed rigid surfaces, including metal surfaces, is believed to be the excessive shrinkage of the coating due to the crosslinking reaction. Normally, 10 to 20% shrinkage (measured by dilatometry) is expected on polymerization. Reference: "Principles of Polymer Systems," F. Rodriquez, p. 97, McGraw-Hill (1976). This shrinkage leads to film cracking and/or interfacial stresses which cause either immediate or progressive adhesion failure. The coatings of the present invention exhibit no apparent shrinkage or cracking upon cure and this is believed to be the result of the high inorganic oxide content.

SUMMARY OF THE INVENTION

The present invention discloses novel non-coloring photocured protective coatings for silver, brass, nickel and aluminum, which exhibit no apparent shrinkage upon cure, and which are resistant to steam, moisture, acids, organic solvents and household chemicals. Yet these protective coatings may be removed cleanly from the said metal surfaces by exposure to ammonium hydroxide solution having a concentration of at least 15%.

DETAILED DESCRIPTION OF THE INVENTION

The superior adhesion, abrasion resistance and corrosion protection of the herein disclosed compositions (in the cured state) are obtained by the incorporation of substantial amounts of inorganic oxide sols preferably selected from silica, zirconia or alumina sols, in non-silyl polyfunctional acrylate or methacrylate monomers. Two factors give the compositions of the present invention their unique properties. The first factor is the structure of the polyfunctional monomers that act as dispersants for the inorganic oxide sols, and the second is the relative proportion of inorganic oxide sol to monomers. In particular, it is found that transparent, stress-free coatings with good adhesion to silver, brass, nickel and aluminum, result only when the weight content of inorganic oxide sol is not less than 33% and no more than 66.7%. The infrared spectra of the cured protective coatings disclosed in the present invention are characterized by two main bands, the first is a relatively sharp peak centered near 1720 $cm^{-1}$ and is due to the absorption of the ester functionality in the crosslinked polymer matrix, and the second is a very broad band associated with the inorganic oxide sol particles trapped in the crosslinked polymeric matrix. For example, in the case of the silica sol modified hard coats the peak near 1720 $cm^{-1}$ is accompanied by a broad $SiO_2$ band centered around 1030 $cm^{-1}$ with a half band width of 325 $cm^{-1}$.

Non discoloring protective coatings for difficult-to-adhere-to-metals such as silver, brass, aluminum, and nickel derived from UV or e-beam irradiation of non-aqueous dispersions of inorganic oxide sols in ethylenically unsaturated monomers have not been disclosed previously.

The present invention describes a method for providing protective coatings for metal substrates including silver, copper, brass, nickel and aluminum. Also described is a photocurable coating composition especially well suited as a protective coating for vapor coated or sputter coated silver, nickel, copper and aluminum metals on thermoplastic shaped articles. The photocurable protective coating compositions of the invention are readily applied to metal substrates and when applied and cured provide a coating with improved adhesion and improved resistance to moisture and steam. These photocurable protective coating compositions are especially suited for preventing discoloration of the metal due to corrosion by the environment.

These curable coating compositions comprise an anhydrous dispersion of colloidal metal oxide particles of silica, zirconia, or alumina, or mixture thereof, in a solution of polyethylenically unsaturated monomers, said composition preferably comprising by weight per part of ethylenically unsaturated monomer, or mixture of monomers, 0.5 to 2.0 parts colloidal metal oxide, and 2 to 10 parts volatile nonaqueous solvent.

Such protective overcoats are particularly useful in preventing tarnishing and corrosion of the metal substrates in such applications as household fixtures, metallized decorative surfaces, metallized reflective tape, metallized energy control film and the like. Such overcoats tend to remain perfectly transparent to visible light, do not significantly discolor or reduce the reflectivity of the metal surface, and retain excellent adhesion to the said metals and excellent abrasion resistance under relatively harsh environmental conditions such as repeated exposure to boiling water, repeated exposure to steam, exposure to organic solvents, and to temperatures exceeding 150° C.

A composition which satisfy all of the above desirable properties is an energy curable composition comprising an anhydrous dispersion of colloidal inorganic oxide particles of silicon dioxide, zirconium dioxide or dialuminum trioxide particles having an average particle size of less than 50 nanometers in a solution of non-silyl polyethylenically unsaturated monomers, said composition preferably containing 0.5 to 2.0 parts (preferably 1.0 to 2.0 parts) inorganic oxide, and 2 to 10 parts (preferably 4.0 to 5.0 parts) volatile nonaqueous solvents by weight per part of polyethylenically unsaturated monomer.

In a first step of the process for preparing storable coating composition of the invention, a substantially anhydrous dispersion of colloidal $SiO_2$, $Al_2O_3$ or $ZrO_2$ particles is prepared by dehydration of the corresponding hydrous sol. This step, referred to as the dehydration step, involves the separation of the colloidal inorganic oxide particles from the water by the gradual substitution of the aqueous phase with a volatile organic liquid that is a good solvent for the polyethylenically unsaturated monomers that constitute the remainder of the composition.

Inorganic oxide sols of silicon dioxide, zirconium dioxide and dialuminum trioxide in aqueous media are well known in the art and readily available commercially. Silica sols in water or water-alcohol solutions are available commercially under such trade names as "Ludox" (manufactured by E.I. duPont de Nemours and Co., Inc., Wilmington, Del., USA) or "Nalco" (manufactured by Nalco Chemical Co., Oak Brook, Ill. USA). One excellent choice is "Nalco 1129" which is provided as colloidal silica dispersion in 60%/40% by weight isopropanol/water solution wherein the mean particle size is 20 millimicrons, the pH 3.5 and the solid content is 30% by weight. Another equally suitable starting material is "Nalco 1034A" available as a silica sol with mean particle size of 20 millimicrons, pH 3.2, and solid content 34% by weight. It should be obvious to those skilled in the art, however, that any silica hydrosols, including alkaline silica hydrosols, may be used as sources of silica particles for the embodiment of this invention as long as their pH is reduced to the 2.5–7.0 range.

Alumina sols which may be used in this invention are also readily available commercially. For example Nalco "1SJ-614" is an aqueous colloidal dispersion of sub-micron alumina particles having an average particle size of 2 millimicrons and a pH of 5.1 at a 10% by weight solid content. Other commercially available inorganic oxide sols that may be used in this invention are Nalco "1SJ-612", an aqueous dispersion of submicron alumina-coated silica particles having an average particle size of 20 millimicrons and a pH of 4.2 at 30% solid content.

Finally, several grades of zirconia sols that may be used in this invention are available commercially from Nyacol Corp. (Ashland, Mass.) as 20% $ZrO_2$ dispersions, having an average particle size of 50 millimicrons, stabilized by nitrates or acetate counterions at pH 2.4.

The dehydration step is affected by first adding a water miscible organic solvent A and removing the water. If the added solvent has a boiling point higher than that of water, the water can be removed by simple distillation. If the water miscible solvent has a boiling point lower than that of water, the water can be removed by azeotropic distillation. It is preferable that the water be removed as quickly as possible and at as low a temperature as possible. Consequently, it is preferable to conduct the distillation under vacuum. This procedure is disclosed in U.S. Pat. No. 4,499,217 for the dehydration of silica sol.

Preferably the water miscible solvents of use in the dehydration of the inorganic oxide sols are protic group containing organic liquids such as the lower alcohols having 1 to 4 carbon atoms, lower glycols having 2 to 6 carbon atoms, and most preferably lower glycol ethers having 3 to 6 carbon atoms and 1 to 2 ether linkages. Specific examples are methanol, ethanol, 2-propanol, n-butanol, t-butyl alcohol, ethylene glycol, methoxyethanol, ethoxyethanol, propoxyethanol, butoxyethanol, methyl "Carbitol", ethyl "Carbitol", and mixtures thereof. The use of these protic solvents allow the dehydration to be carried out to the point where water is substantially all removed. For example use of propoxyethanol in the vacuum distillation of water from aqueous silica sol allows the dehydration to proceed to less than 1% residual water in the remaining glycol ether stabilized sol. In this manner up to 80% by weight colloidal inorganic oxide dispersions in propoxyethanol may be easily prepared.

Non-protic water miscible organic liquids that can also be used in the dehydration of inorganic oxide sols are aliphatic esters and ketones and sulfoxides such as ethyl acetate, propyl acetate, butyl acetate, methoxyethyl acetate, ethoxyethyl acetate, propoxyethyl acetate, butoxyethyl acetate, triethyl phosphate, methyl ethyl ketone, methyl propyl ketone and dimethyl sulfoxide. Dimethyl sulfoxide is particularly suitable for dehydrating alumina and zirconia sols. However, in the majority of cases where a water-miscible ester or ketone has to be used, it is preferred to have an alcohol present even as a minor component during the dehydration step. Thus 9⁄10 mixtures of the alcohol in the ketones or acetates mentioned above are often suitable.

In the second step for the preparation of the composition of this invention the polyethylenically unsaturated monomer or mixture of monomers is added to the inorganic oxide sol.

Preferred polyethylenically unsaturated monomers are the protic group substituted ester or amide of acrylic acid having the general formula

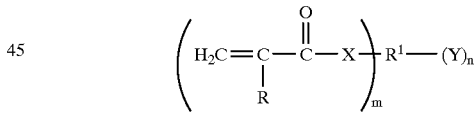

where:
R is hydrogen, or a lower alkyl group of 1 to 4 carbon atoms or halogen; preferably, hydrogen or methyl,
X is —O— or —$NHR^2$—, in which R is hydrogen or a lower alkyl group having one to four carbon atoms;
$R^1$ is a polyvalent saturated linear, branched or cyclic aliphatic group having carbon, hydrogen and, optionally ether oxygen atoms and NHC=O groups and having a molecular weight of 14 to 1000 and a valence of m+n; m is an integer designating the number of acrylic or methacrylic groups in the ester or amide having a value of two to six, or where a mixture of acrylic or methacrylic compounds are used, m has an average value of 1.05 to 5.95;
n is an integer having a value of one to five; and
Y is a protic functional group preferably selected from the groups consisting of —OH, —SH, —COOH, —$SO_3H$, and —$PO(OH)_2$.

Preferred protic group substituted esters are the acrylic or methacrylic acid esters of aliphatic polyhydric alcohols having the general formula

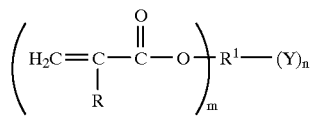

where R, R$^1$, m and n are defined above. Examples of such esters include commercially available pentaerythritol bis- and triacrylate, pentaerythritol bis- and trimethacrylate, dipentaerythritol di-, tri-, tetra, and pentaacrylate and methacrylate, hydantoin di-, tri, tetra and hexaacrylate and methacrylate.

The above esters of polyhydric alcohols are well known to those skilled in the art. For example, one method of obtaining a hydroxyl substituted mono, di, or triacrylate ester is by reacting acrylic acid with excess di, tri, or tetrahydroxy compound. Thus, for example, acrylic acid can be reacted with pentaerythritol to yield a mixture of the di, tri, and tetraacrylate ester. Another method would be to react glycidyl acrylates with acrylic acid to form hydroxylated multifunctional acrylates upon hydrolysis of the oxirane functionality.

The above crosslinkable protically substituted polyethylenically unsaturated monomers may be diluted with up to 2 parts, preferably 0.1 to 0.5 part by weight of any ethylenically unsaturated monomer (in respect to 1 part by weight of the protically substituted monomers). Preferably the majority of comonomers are at least diethylenically unsaturated monomers and copolymerizable with the protically substituted monomers. Generic classes of useful comonomers include acrylic and methacrylic acid esters and anhydrides, ethylenically unsaturated anhydrides, olefins, acrylamides, ethylenically unsaturated ureas and urethanes, vinyl esters, vinyl ethers, vinyl halides, vinyl epoxy resins, vinyl silanes, vinyl heterocycles, and polymers and prepolymers of these materials. Monoethylenically unsaturated comonomers include acrylic acid, methacrylic acid, acrylamide, methyl methacrylate, methyl acrylate, ethyl acrylate, acrylonitrile, styrene, butadiene, butyl acrylate, N-vinyl pyrrolidone, 2-(N-butylcarbamyl)ethyl methacrylate, and 2-(N-ethylcarbamyl)ethyl methacrylate. Particularly suitable diethylenically unsaturated monomers include tetraethylene glycol diacrylate, hexamethylene diacrylate and dimethacrylate, glycerol diacrylate and dimethacrylate, and glycidyl acrylate and methacrylate. Other suitable polyfunctional acrylate comonomers include trimethylol propane triacrylate, neopentylglycol triacrylate, 1,3,5-tri(2-methacryloxyethyl)-s-triazine, pentaerythritol tetraacrylate and methacrylate, and dipentaerythritol hexaacrylate. Other copolymerizable diluents that may be incorporated to enhance flexibility of the cured coating include a variety of acrylated urethanes, one example of which is Gafguard™ 233(GAF Corp., NY).

Other agents that can be incorporated in the composition of this invention include flatting agents, surface active agents, dyes and anti-tarnishing agents.

The photocurable compositions also contain appropriate photosensitizers formulated to effect crosslinking either in air or in inert atmosphere, such as nitrogen. In general the amount of photosensitizer may vary from 0.01% to 10% by weight of curable species, but for thin films 1–6% by weight of polymerizable monomers is preferred.

For photocuring thin film coatings of the compositions in air, suitable photosensitizers consisting of mixtures of ketone type and hindered amine type compounds are used. Among the preferred ketones are benzophenone, acetophenone, benzil, benzaldehyde and o-chlorobenzaldehyde, xanthone, thioxanthone, 9,10-anthraquinone, 2-hydroxy-1,2 diphenyl-1-ethanone (Irgacure™ 184) available from Ciba-Geigy, and many other aromatic ketones. Among the preferred hindered amines are methyldiethanolamine, ethyldiethanolamine, dimethylethanolamine, diethylethanolamine, triethanolamine, phenylmethylethanolamine, diethylethanolamine, triethanolamine, phenylmethylethanolamine, dimethyl-aminoethyl-benzoate, and others. Preferred ratios by weight of ketone to amine are between 80/20 and 20/80, but in general ratios of 50/50 to 60/40 are satisfactory.

For effecting cure in an inert environment, such as nitrogen, many commercially available photosensitizer compounds are known, among which those known under the trade names Irgacure™ (Ciba-Geigy Co.) or Darocur™ (Merck).

In the practice of the present invention, the curable coating compositions are compounded by adding together the colloidal metal oxide organosol, preferably being 30–55% by weight colloidal silica, alumina, or zirconia in the organic solvent, the curable ethylenically unsaturated monomers, preferably 20–30% by weight solution in suitable organic solvent, the optional polymeric or oligomeric diluent, an initiator in the proportion of about 2–4% by weight of curable species, and any other optional additives such as flatting agents or surfactants. Where curing is to be brought about by ultraviolet irradiation it is preferable that these addenda be transparent to the radiation used for curing. After thorough mixing of the components, a generally homogeneous, clear coating composition is obtained which may be applied in any number of ways: by dipping, spraying, electrospraying, spincoating, rollcoating, knifecoating, and the like. Afterwards the solvent is allowed to evaporate and the coating cured by UV irradiation at dosages of from 1 megarad to 100 megarad or more. The UV radiation used may have a wavelength ranging from 18.5 to 400 nm. Suitable sources of radiation include mercury, xenon, carbon arc and tungsten filament lamps, sunlight, etc. The colloidal metal oxide organosol is thus cured in the presence of and with the monomers.

Substrates

The brass, silver, nickel or aluminum substrates may be any form, such as sheets, films, pipes, or any shaped solid object. The coatings are useful particularly on silver, copper alloy, nickel, and aluminum metallized thermoplastic substrates that would show adverse effects when subjected to 100° C. for more than 15 minutes, and preferred for substrates that would show adverse effects when exposed to 80° C. for 15 minutes. Such adverse effects would include discoloration, shrinkage, warping, imaging, or permanent change in physical or chemical properties. The metallization of the thermoplastic substrate could be achieved by any number of ways, including plasma deposition, laser deposition, carbon arc deposition, sputter deposition, and the like. Suitable thermoplastic substrates that may be metallized and subsequently coated with the compositions of this invention include polyester thermoplastics, polysulfones, polycarbonates, polyimides, polyamides, polyolefins, polyurethanes, vinyls, and acrylics, and their various copolymers.

The following specific, but non-limiting, examples will serve to illustrate the present invention.

EXAMPLE 1

Five hundred grams Nalco™ 1129 silica sol (an aqueous colloidal silica sol in 30%/40% water-isopropanol mixture having a pH of 3.5, average particle size of 20 nm and a solid content of 30%) was concentrated at 55° C. in a rotoevaporator to 300g. The concentrate was diluted with 1200 g n-propanol and the solution obtained added over a period of thirty minutes to the still pot of a distillation apparatus containing 900 g of refluxing n-propanol. There distilled an azeotrope of water and alcohol at 88° C. Distillation was continued until the still head temperature increased to 97° C. There remained in the still pot 650 g of clear silica in alcohol that had a silica content of 23% and analyzed less than 3% water.

A 23% solution in n-propanol was made to contain 0.8 part by weight of pentaerythritol triacrylate (PETA, from Sartomer Co. Pa.), 0.2 part tetraethyleneglycol diacrylate, 0.04 part Irgacure™ 184 photoinitiator, and 0.01 part Tinuvin™ 292 photostabilizer (Ciba-Geigy Co.) Coatings containing (in the dry, cured state) 80.0 (Sample F), 66.6 (Sample E), 50.0 (Sample D), 33.3 (Sample C), 10.0 (Sample B) and 0% (Sample A) colloidal silica were prepared by mixing one part of the photocurable solution with 4, 2, 1, ½, ⅓, ⅒ and 0 parts of the alcohol. 1.5 mm thick polished brass plates (Kohler Co.) were dip-coated in the above solutions, the coating dried at 60 C for five minutes and then radiation cured in air in a UV Processor, Model No. Q.C. 120N (manufactured by Radiation Polymer Co.) at a rate of 30 meters per minute under a 165 watts per centimeter high pressure mercury lamp.

Adhesion of the cured layer to the polished brass plates was tested by the modified crosshatch adhesion test according to the procedure in ASTM3359-83. This test requires scribing the coated specimen to form a grid of twenty 5 mm×5 mm squares. Clear cellophane pressure-sensitive adhesive tape is applied to the surface, pressed down, and stripped sharply away at a 90° C. angle to the surface. This procedure is repeated three times, using fresh tape each time. Removal of any square of coating is considered an adhesion failure, whereas 100% adhesion indicates no removal of coating from any square. The cellophane tape used in these tests were 3M #610 tape. The crosshatch adhesion tests were performed at ambient conditions and repeated on each plate after 2 hour exposure to boiling deionized water, followed by 24 hour exposure to dionized water held at 70° C.; followed by 24 hour exposure to water vapor at 62° C. At the end of the aging cycle, the coating is rubbed thrice with #0000 steel wool pads and the coating inspected visually for damage. The results are given in table 1.

The following conclusions may be made: adhesion of the protective coating to the brass surface occurs only when colloidal silica particles from a silica sol is added to a level of 33.3% or more. The protective coating does not pass the cross-hatch adhesion test when the colloidal silica content is significantly below 33.3%. In addition, the protective coating does not withstand exposure to boiling water, hot water, or steam when the colloidal silica content is significantly below 33.3%. In particular, at colloidal silica levels above 66.6% or below 33.3% exposure of the brass surface to water vapor at 62° C. result in corrosion of the brass and discoloration.

When dipped in a 15% ammonium hydroxide solution, the coatings in Samples C, D and E lost their adhesion to the brass within 5 minutes without apparent damage to the polished brass surface. However, the coatings in all three Samples C, D and F withstood 17 hours exposure to glacial acetic acid, acetone, trichlorocetylene, and isopropanol without apparent damage or loss of adhesion.

EXAMPLE 2

The coating compositions prepared in example 1 were applied by dip-coating to 1.7 mm nickel-plated brass plates (Kohler Co.) and the coating cured by UV irradiation as in example 1. Test results are summarized in Table 2.

The behavior of the silica sol modified protective coating on nickel differ from its behavior on brass: excellent adhesion to nickel, as measured by the cross-hatch adhesion test, is observed only when the colloidal silica content is within the range 50–66.6%. In particular the coating was removed from the nickel surface by immersion in hot water when the silica content was below 50% or above 66.6%. At the silica content level higher than 66.6% the coating discolored when exposed to hot water or water vapor, although it retained some of its adhesion to the metal surface.

When dipped in a 15% ammonium hydroxide solution, the coatings in Samples D and E lost their adhesion to the nickel within 5 minutes without damage to the surface. However, these coatings withstood 17 hours exposure to glacial acetic acid, acetone, trichloroethylene and isopropanol without apparent damage or loss of adhesion.

EXAMPLES 3–9

1.5 parts by weight Nalco™ 84SS-258, a recently commercialized dehydrated silica sol (30% by weight colloidal silica dispersed in 2-propoxyethanol, having an average particle size of 25 nanometers, and a nominal water content of less than 2%) was mixed with 1.0 part acrylic monomer solution consisting of 30% by weight Photoglaze™ 1C5001-35 (obtained from Lord Corp., Erie, Pa.) dissolved in 2-propanol. The resulting clear mixture, was coated using a #9 RDS coating rod (R.D. Specialties, Rochester, N.Y.) on the following substrates:

1-50 micrometer thick polyethylene terephthalate film (3M, St. Paul, Minn.) sputter coated with a 20 nanometer thick silver film.

2-50 micrometer thick Mylar™ polyester film sputter coated with a 20 nanometer thick silver film.

3-75 micrometer thick Kapton™ polyimide film sputter coated with a 50 nanometer thick silver film.

4-50 micrometer thick polyethylene terephthalate film (3M) vapor coated with a 10 nanometer thick aluminum film.

5-50 micrometer thick Melinex™ polyester film, vapor coated with 50 nanometer thick aluminum film.

6-50 micrometer thick Mylar™ film sputter coated with 10 nanometer thick nickel film.

7-175 micrometer thick Lexan™ polycarbonate film sputter coated with 10 nanometer thick nickel film.

After drying the coatings at 60° C. for 3 minutes in a forced air oven, the coatings were cured in the RPC processor as in example 1. The cured coatings had a thickness (measured by optical microscopy) of about 5 micrometers and were composed of 60% by weight colloidal silica in 40% crosslinked acrylic polymer (measured by pyrolyzing the organic component at 900° C. in a furnace and weighting the residual silica).

Adhesion of the cured layer to the metallized films was tested by the modified crosshatch adhesion test according to the procedure in ASTM-3359-834 as in example 1. The crosshatch adhesion tests were performed both at ambient conditions and after 100 hour exposure to 95% relative humidity at 35° C. As a further test of adhesion, each coated sample was rubbed thrice with #0000 steel wool pads and the coating inspected for damage.

The cured coatings exhibited 100% crosshatch adhesion and no observable damage by steel wool rubbing on all the substrates listed above, both before and after aging. The infrared spectrum of the cured coating revealed two main peaks; one centered near 1720 cm$^{-1}$ with a half bandwidth of 55 cm$^{-1}$ and the other is a very broad band centered at 1020 cm$^{-1}$ with a half band width of 350 cm$^{-1}$.

By contrast, when exactly the same coating procedure was used to coat all the substrates above with 30% solution of Photoglaze™ 1C5001-35 acrylic monomers, without the addition of silica sol, both the crosshatch adhesion tests and the steel wool abrasion tests failed.

EXAMPLE 10

In a 500 cc round bottom flask was dissolved 50 g of PETA in 101.5 g 2-propoxyethanol. To this solution was added slowly and with agitation 100 g of Nalco™ 1SJ-612 alumina coated silica sol and the water-glycol ether in the dispersion removed at 60° C. in a roto-evaporator. To the residual thick syrup was added 100 g of 2-propoxyethanol. The dispersion was concentrated again by removal of the glycol ether at 65° C. until the residual weight in the roto-evaporator (compound A) reached 90.8 g.

One part of A was mixed with 2 parts ethanol, 0.04 parts Darocur™ 1173 photoinitiator and 0.05 part Gafguard™ 233 acrylated urethane photopolymer (GAF Co.) as a flexibilizer. The coating solution was coated and cured on substrates 1–7 in exactly the same fashion as in examples 3–9 above. The cured, transparent coatings were tested as in examples 3–9 and exhibited 100% crosshatch adhesion both at ambient conditions (45% R.H. and 19° C.) and after aging for 100 hours at 95% R.H. and 35° C. Drops measuring approximately 0.05 ml. of ethyl acetate, methylethyl ketone, trichloroethylene, 5% hydrogen peroxide, and 5% ammonium hydroxide solutions were deposited on the coatings and left, covered, for 10 hours at 19° C. No damage and no loss of adhesion was observed as a result of exposure to the above liquids.

EXAMPLE 11

In a 1 liter round bottom flask were mixed 200 g of Nalco 1SJ-614 alumina sol and 200 g dimethyl sulfoxide. The flask was attached to a roto-evaporator and the water extracted at 60° C. until the weight of the residual sol reached 80 g. To this residual clear sol were added 10 g PETA, 2 g hexamethylene diacrylate, 0.1 g Tinuvin™ 292 photostabilizer, and 0.4 g Irgacure™ 184 photoinitiator. The mixture was flow coated over 1.5 mm thick polished brass plates (Kohler Co.) and the coating dried in a forced air oven at 70° C. for ten minutes. The coated plates were then passed under the UV lamps as in example 1 to obtain abrasion resistant hardcoats that passed the ASTM-3359-83 crosshatch adhesion test both at ambient conditions (45% R.H. and 19° C.) and after aging for 100 hours at 95% R.H. and 35° C. The cured coatings had a thickness (measured by optical microscopy) of about 8 micrometers and were composed of 66% by weight colloidal alumina in 34% crosslinked acrylic polymer (measured by pyrolyzing the organic component at 900° C. in a furnace and weighting the residual alumina).

TABLE 1

| | CROSSHATCH ADHESION | | | | |
|---|---|---|---|---|---|
| % CEO$_2$ | Ambient | 2 hr. 100° H$_2$O | 24 hr. 70° H$_2$O | 24 hr. 62° vapor | St. Wool Abrasion |
| 0 | fail | fail | fail | tarnish | fail |
| 10 | fail | fail | fail | tarnish | fail |
| 33.3 | pass | pass | pass | no tarnish | pass |
| 50.0 | pass | pass | pass | no tarnish | pass |
| 66.6 | pass | pass | pass | no tarnish | pass |
| 80.0 | fail | fail | fail | tarnish | fail |

TABLE 2

| | CROSSHATCH ADHESION | | | | |
|---|---|---|---|---|---|
| % CEO$_2$ | Ambient | 2 hr. 100° H$_2$O | 24 hr. 70° H$_2$O | 24 hr. 62° vapor | St. Wool Abrasion |
| 0 | fail | fail | fail | fail | fail |
| 10 | fail | fail | fail | fail | fail |
| 33.3 | fail | fail | fail | fail | fail |
| 50.0 | pass | pass | pass | pass | pass |
| 66.6 | pass | pass | pass | pass | pass |
| 80.0 | fail | discolor | discolor | discolor | fail |

I claim:

1. A plumbing fixture comprising an unprimed metal surface selected from the group consisting of silver, brass, nickel and aluminum having adhered thereto an abrasion resistant, transparent to visible light, moisture resistant coating comprising 33.3 to 66.7% by weight of colloidal inorganic particles embedded in a radiation cured crosslinked polymer matrix of a polymer formed from the cure of monomers comprising a polyethylenically unsaturated amide of acrylic acid.

2. A pressure-sensitive adhesive tape comprising a surface metallized with a metal selected from the group consisting of silver, brass, nickel and aluminum and having adhered thereto an abrasion resistant, transparent to visible light, moisture resistant coating comprising from 33.3 to 66.7% by weight of colloidal inorganic particles embedded in a radiation cured crosslinked polymer matrix of a polymer formed from the cure of monomers comprising a polyethylenically unsaturated amide of acrylic acid.

3. The plumbing fixture of claim 1 or the pressure-sensitive adhesive tape of claim 2 wherein said colloidal particles comprise 50 to 66.7% by weight of said coating and have an average diameter of 50 millimicrons or less.

4. The plumbing fixture of claim 1 or the pressure-sensitive adhesive tape of claim 2 wherein said colloidal inorganic particles are selected from the group consisting of silica, zirconia, alumina and mixtures thereof and have an average diameter of 50 millimicrons or less.

5. A plumbing fixture comprising a metal surface selected from the group consisting of silver, brass, nickel and aluminum having adhered thereto an abrasion resistant, transparent to visible light, moisture resistant coating comprising 33.3 to 66.7% by weight of colloidal inorganic particles selected from the group consisting of zirconia, alumina, and alumina coated silica of less than 50 millimicrons embedded in a radiation cured crosslinked polymer matrix of a polymer formed from the cure of monomers comprising a polyethylenically unsaturated amide of acrylic acid.

6. A pressure-sensitive adhesive tape comprising a surface metallized with a metal selected from the group consisting of silver, brass, nickel and aluminum and having adhered thereto an abrasion resistant, transparent to visible light, moisture resistant coating comprising from 33.3 to 66.7% by weight of colloidal inorganic particles selected from the group consisting of zirconia, alumina and alumina-coated silica with a particle size of less than 50 millicrons embedded in a radiation cured crosslinked polymer matrix of a polymer formed from the cure of monomers comprising a polyethylenically unsaturated amide of acrylic acid.

7. The plumbing fixture of claim 5 or the pressure-sensitive adhesive tape of claim 6 wherein said colloidal particles comprise 50 to 66.7% by weight of said coating and said metal is selected from the group consisting of silver, brass and nickel.

8. The plumbing fixture or pressure-sensitive adhesive tape of claim 7 wherein said colloidal inorganic particles are selected from the group consisting of silica, zirconia, alumina and mixtures thereof.

9. The plumbing fixture of claim 1 or the pressure-sensitive adhesive of claim 2 wherein said amide of acrylic acid is represented by the formula

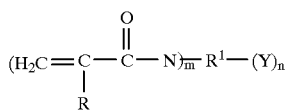

wherein R is hydrogen, an alkyl group of 1 to 4 carbon atoms, or halogen;

$R^2$ is hydrogen or an alkyl group of 1 to 4 carbon atoms;

$R^2$ is a polyvalent saturated aliphatic group of a molecular weight of 14 to 1000 and a valence of m plus n;

m is an integer having an average value of 1.05 to 5.95;

n is an integer having a value of 1 to 5; and

Y is a protic functional group selected from the group consisting of —OH, —SH, —COOH, —SO$_3$H, and —PO(OH)$_2$.

10. The plumbing fixture of claim 1 or the pressure-sensitive adhesive of claim 2 wherein at least one of said monomers is represented by the formula

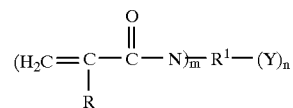

wherein R is hydrogen, an alkyl group of 1 to 4 carbon atoms, or halogen;

$R^2$ is hydrogen or an alkyl group of 1 to 4 carbon atoms;

$R^1$ is a polyvalent saturated aliphatic group of a molecular weight of 14 to 1000 and a valence of m plus n;

m is an integer having an average value of 1.05 to 5.95;

n is an integer having a value of 1 to 5; and

Y is a protic functional group selected from the group consisting of —OH, —SH, —COOH, —SO$_3$H, and —PO(OH)$_2$.

11. The plumbing fixture of claim 1 or the pressure-sensitive adhesive of claim 2 wherein said amide of acrylic acid is represented by the formula

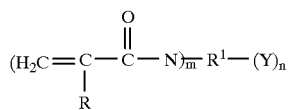

wherein R is hydrogen, an alkyl group of 1 to 4 carbon atoms, or halogen;

$R^2$ is hydrogen or an alkyl group of 1 to 4 carbon atoms;

$R^1$ is a polyvalent saturated aliphatic group of a molecular weight of 14 to 1000 and a valence of m plus n;

m is an integer having a value of 1.05 to 5.95;

n is an integer having a value of 1 to 5; and

Y is a protic functional group selected from —OH, —SH, —COOH, —SO$_3$H, and —PO(OH)$_2$;

and said monomers are free of acryloxy silanes and epoxy silanes.

* * * * *